Feb. 17, 1970   J. KURE-JENSEN   3,495,501
VALVE OPERATING AND EMERGENCY CLOSING MECHANISM
Filed June 4, 1968   2 Sheets-Sheet 1

INVENTOR:
JENS KURE-JENSEN,
BY W.C. Crutcher
HIS ATTORNEY.

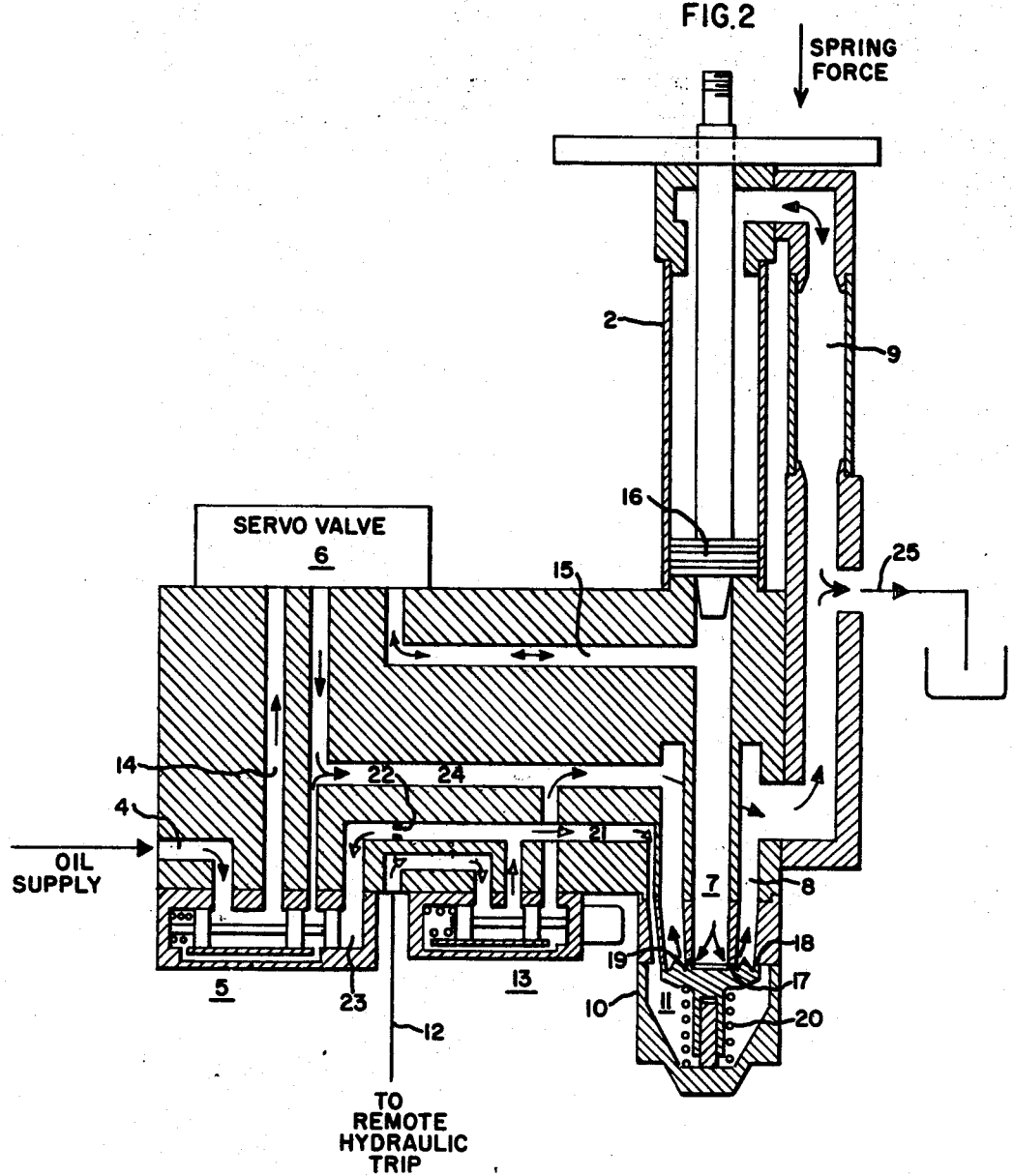

United States Patent Office 3,495,501
Patented Feb. 17, 1970

3,495,501
VALVE OPERATING AND EMERGENCY
CLOSING MECHANISM
Jens Kure-Jensen, Schenectady, N.Y., assignor to General
Electric Company, a corporation of New York
Filed June 4, 1968, Ser. No. 734,390
Int. Cl. F15b 11/08, 15/22, 13/043
U.S. Cl. 91—440          9 Claims

ABSTRACT OF THE DISCLOSURE

A single-acting hydraulic valve actuator including a pilot-operated disk dump valve with quick opening and high flow rate characteristics. The dump valve includes means to trip and reset locally to effect temporary closing of a steam valve by the hydraulic actuator, as well as means to trip remotely to effect emergency closing of the steam valve.

BACKGROUND OF THE INVENTION

This invention relates generally to valve actuating mechanisms and more particularly to hydraulic valve operating systems having a dual control.

The present invention was developed primarily for use with large steam turbine-generators. Such turbine-generators generally include steam valves which are operated by hydraulic cylinders, often of the single acting type.

In the event of a sharp decrease or loss of electrical load, it is essential that the steam supply to the turbine be shut off immediately to prevent possible overspeed. The length of time permitted between a loss of generator load and the closing of turbine steam admission valves is on the order of 0.1 to 0.2 second. If turbine speed is controlled before actual emergency overspeed conditions exist, it is then desired to reset the trip system so as to reopen the steam valve without closing down the turbine-generator completely. Such steam valve closing with a reset capability is desirable for early valve actuation to anticipate overspeed or in order to test the steam valve.

It is also desirable to have a second means for tripping the steam valve closed from a remote source. In turbine control systems, this remote source is under control of the emergency overspeed protective devices.

One of the problems associated with prior art trip systems is the inability to accommodate high transient flows of fluid from the hydraulic actuator during tripping. Furthermore, difficulties have been experienced in obtaining reliable resetting of the dump valve after tripping has occurred.

One object of the present invention is to provide a valve actuator for a turbine steam valve which can be tripped locally or remotely to effect fast closure of the valve.

Another object of the invention is to provide a hydraulic actuator with a disk dump valve for accommodating high transient flow and facilitating resetting of the dump valve.

Other objects, advantages and features of the present invention will become apparent from the following description of one embodiment thereof when taken in connection with the accompanying drawing.

In the drawing,

FIG. 2 is a schematic fluid flow diagram of the hydraulic actuator and trip system.

SUMMARY OF THE INVENTION

Figure 1:
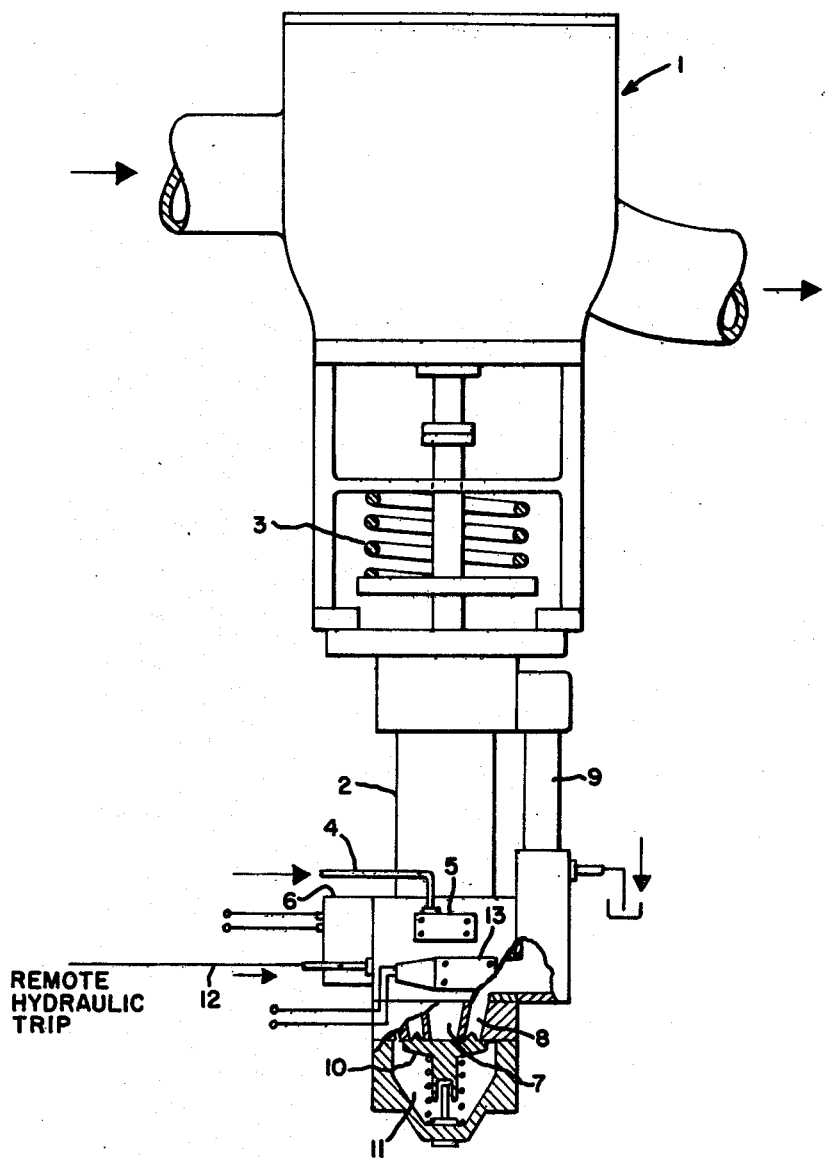
FIG. 1 is an overall schematic view of a steam valve and actuator.

Briefly stated, the invention is practiced by providing a single acting hydraulic actuator with a piston which is normally controlled by supply oil admitted through a servo valve, but which also includes a high-flow evacuation passage leading through a disk dump valve and an enlarged return passage to the other side of the piston. The disk dump valve is controlled by a hydraulic pilot circuit, which also operates a shutoff valve for the main oil supply. A time delay orifice in the hydraulic pilot circuit facilitates resetting of the dump valve before oil supply pressure is reapplied.

DESCRIPTION

Referring to FIG. 1, a steam valve 1 is controlled by a hydraulic actuator incorporating a cylinder 2 in which is disposed a single acting piston biased in the downward direction by a spring 3. High pressure hydraulic fluid, for example, on the order of 1600 p.s.i., is admitted through a supply line 4 via a pilot-operated shutoff valve 5 to a conventional electrohydraulic servo valve 6. Servo valve 6 controls the admission and discharge of hydraulic fluid to cylinder 2 so as to actuate steam valve 1 during normal operation.

A high-flow trip discharge passage for evacuating cylinder 2 comprises an inner passage 7, an outer annular passage 8, a return line 9 of generous dimensions leading to the other side of the piston in cylinder 2. A disk dump valve 10 blocks communication between chambers 7 and 8 and is held in place by pilot pressure in chamber 11.

Hydraulic pilot pressure in chamber 11 is maintained by pressure of oil supplied through line 12, which can be evacuated from a remote source, and which also passes to chamber 11 by way of a local solenoid trip valve 13. As will be explained in connection with FIG. 2, solenoid valve 13 is a three-way valve which permits local tripping of the hydraulic actuator without causing evacuation of the line 12 which might give rise to unwanted tripping of other devices.

Referring now to FIG. 2 of the drawing, which is not to scale, the fluid flow circuits are indicated more clearly. Flow of normal supply oil to and from cylinder 2 is indicated by arrows with solid arrowheads, flow in the drain passages by striped arrowheads, and flow of pilot fluid by open arrowheads. Supply oil entering at passage 4 flows via pilot-actuated shutoff valve 5 to servo valve 6 by way of passage 14. Servo valve 6 admits or discharges fluid through passage 15 to the underside of a piston 16 disposed in cylinder 2.

To provide high-flow evacuation of cylinder 2 so as to permit rapid downward movement of piston 16, an inner passage 7 of rather large dimensions communicates with the underside of piston 16. Surrounding passage 7 is an annular coaxial passage 8 of about the same cross sectional area which leads to a generously sized pipe 9 returning to the top side of piston 16. Blocking communication between passages 7, 8, as well as between passage 8 and the pilot chamber 11 is a specially formed valve disk 10.

Valve disk 10 includes an inner seating surface 17, an outer concentric seating surface 18 and a circular beveled flow guiding lip 19. It is lightly biased by a spring 20.

Hydraulic pilot pressure to hold the valve disk in place is supplied through line 12, through solenoid valve 13 to an internal passage 21 communicating with chamber 11. Pilot oil is also supplied by way of a time delay orifice 22 to a pilot chamber 23 in shutoff valve 5 so as to hold it in the position shown.

Internal drain passages from shutoff valve 5, servo valve 6 and solenoid valve 13 may all be interconnected in a drain passage 24, which may also communicate with the trip evacution passages 8, 9, and an outlet 25 leading to an external drain.

OPERATION

In normal operation, shutoff valve 5 is open permitting communication of supply oil to servo valve 6 which admits or discharges fluid through passage 15 to position piston 16. It is held open by pressure at 23.

Tripping to initiate fast closing of the steam valve is accomplished either by evacuation of the pilot pressure in line 12 from a remote location, or by local actuation of solenoid valve 13 so as to interconnect passage 21 with drain passage 24. In either event, pilot pressure in chamber 11 drops and the valve disk 10 opens under the influence of pressure in passage 7. Very rapid flow of fluid takes place from passage 7 into passage 8 as aided by the deflecting lip 19 which assists reversal of flow. As soon as valve disk 10 commences opening, the outer seating portion 18 also unseats and pressure in chamber 11 decays even more rapidly. As the piston 16 moves downward, it provides an expanding chamber above the piston for the fluid rapidly draining through the return pipe 9. With the exception of the volume occupied by the stem, most of the fluid is accommodated in this manner. The difference flows outward to drain through passage 25. In this way, very high transient flow rates have been obtained which will exceed 1000 gallons per minute for short periods on the order of 0.2 second.

One of the characteristics of a disk dump valve is that it is difficult to reseat when any flow is taking place therethrough. To facilitate reseating, shutoff valve 5 is arranged to close and block the supply of oil to servo valve 6 when the pilot pressure chamber 23 is evacuated. When pilot pressure is again applied to passage 21 so as to introduce reseating pressure to chamber 11, orifice 22 serves to provide a delay in building up pilot pressure in pilot chamber 23 of the shutoff valve. Therefore, the dump valve disk 10 is securely reseated before the shutoff valve is reopened by the pilot pressure.

In connection with a steam turbine valve actuating system, solenoid valve 13 would be employed to locally actuate the dump valve without loss of pressure in line 12. The solenoid trip signal might come from a normal load rejection, from an early valve actuation system, or from a valve testing system. The characteristic of all of the foregoing is that it is desired to re-establish pilot pressure and reopen the steam valve when the solenoid valve returns to its normal position.

On the other hand, the pilot supply 12 would be remotely evacuated to produce the same rapid closing of the steam valve in the event of emergency overspeed. Again, resetting may be obtained by application of pilot pressure to line 12.

With respect to the rapid closing feature, it should be particularly noted that passages 7, 8 and 9, which together form the high-flow evacuation passage, are all of approximately the same cross sectional area. The size and proximity of these passages to the cylinder insures rapid actuation with minimum fluid friction.

What I claim is:
1. A resettable trip system for a single-acting hydraulic actuator of the type having a reciprocating piston spring-biased toward an actuator chamber which is pressurized with hydraulic fluid controllably supplied thereto by a servo valve from a pressure source, comprising:
   conduit means providing a fluid evacuation passage from said actuator chamber to the other side of said piston, including inner and outer coaxial passages communicating at their ends so as to reverse the flow direction of evacuated fluid, one of the coaxial passages also communicating with the actuator chamber,
   a source of pressurized pilot fluid,
   a dump valve disk having one side arranged to block communication between said coaxial passages and the other side exposed to a pilot pressure chamber,
   a trip valve operatively connected between the pilot source and said pilot chamber so as to control the pressure therein to actuate the dump valve disk, and
   means blocking flow of pressure fluid to the actuator chamber during activation of said trip valve.

2. The combination according to claim 1, wherein said conduit means includes a return passage connected between the outer coaxial passage and a second expansible actuator chamber on the spring-biased side of said piston, the effective flow areas of said inner passage, said outer passage and said return passage all being substantially the same and sized for high transient flow, whereby minimum flow resistance is encountered during evacuation and the evacuated flow is substantially accommodated by the actuator and said passages.

3. The combination according to claim 1, wherein said dump valve disk includes an inner seating portion for blocking communication between said coaxial passages, an outer concentric seating portion for blocking communication between the outer passage and the pilot chamber, and wherein said outer passage is connected to serve as a common drain from the pilot chamber and from the actuator chamber when the dump valve disk is opened.

4. The combination according to claim 3, wherein said dump valve disk further includes a flow-guiding lip disposed between said inner and outer seating portions and arranged to facilitate reversal of flow from said inner to said outer passage.

5. The combination according to claim 1, wherein said trip valve is a three-way solenoid valve permitting communication between the pilot source and the pilot chamber in a first inactivated position and blocking the pilot source while draining the pilot chamber in a second activated position, whereby the dump valve may be tripped and reset by the trip valve without depressurizing the pilot source.

6. The combination according to claim 1, wherein said blocking means comprises a shut-off valve held in unblocking position by pilot fluid furnished from said trip valve, whereby loss of pilot pressure actuates both the dump valve disk and the blocking means.

7. The combination according to claim 6, further including a time delay orifice controlling flow of pilot fluid between the shut-off valve and the trip valve, whereby re-supply of fluid to the actuator will be delayed, thereby facilitating resetting of the dump valve disk when pilot pressure is re-established.

8. A hydraulic actuator system including
   a single acting hydraulic cylinder having a piston operatively connected to an output member and arranged with a return spring to bias said member in one direction,
   first, second and third hydraulic circuits operatively associated with a pressure end of said cylinder,
   said first circuit including a servovalve communicating with said cylinder and with a source of hydraulic supply pressure,
   said second circuit having passages sized for high transient flow and including a pilot operated disk dump valve controlling communication from the pressure end of said cylinder around the piston to the other end of the cylinder,
   said third circuit including a trip valve communicating with a source of hydraulic pilot pressure and with said dump valve, said trip valve being normally open to permit communication between said pilot source and said dump valve to hold the same closed, said trip valve being operable to relieve said pilot pressure to open the dump valve to dump hydraulic fluid from one end of said cylinder to the other, permitting said return spring to move said output member in said one direction.

9. A hydraulic actuator system according to claim 8 further including:
a pilot-operated shut-off valve in said first circuit between said hydraulic pressure source and said servo valve, said shut-off valve being in communication through a pilot line with said third circuit and held in normally open position by pressure therein, said pilot line having an orifice therein to delay the pilot action of said shutoff valve relative to that of said dump valve.

References Cited

UNITED STATES PATENTS

| 2,780,204 | 2/1957 | Barley | 91—451 |
| 2,900,960 | 8/1959 | Gratzmuller | 91—454 |
| 3,030,930 | 4/1962 | Gratzmuller | 91—454 |

PAUL E. MASLOUSKY, Primary Examiner

U.S. Cl. X.R.

91—396, 416, 446, 454, 461